(12) United States Patent
Brown

(10) Patent No.: US 6,418,817 B1
(45) Date of Patent: Jul. 16, 2002

(54) WIRE STRIPPER

(76) Inventor: Frank R. Brown, P.O. Box 1369, Kennebunkport, ME (US) 04046

( * ) Notice: Subject to any disclaimer, the term of this patent is extended or adjusted under 35 U.S.C. 154(b) by 1 days.

(21) Appl. No.: 09/966,392

(22) Filed: Sep. 28, 2001

Related U.S. Application Data

(63) Continuation-in-part of application No. 09/781,790, filed on Feb. 12, 2001.

(51) Int. Cl.[7] ................................................ H02G 1/12
(52) U.S. Cl. .............................. 81/9.44; 81/9.4; 30/91.2
(58) Field of Search ........................ 81/9.4, 9.41, 9.42, 81/9.43; 30/90.1, 91.1, 91.2, 90.4

(56) References Cited

U.S. PATENT DOCUMENTS

| | | | |
|---|---|---|---|
| 2,868,049 A | * 1/1959 | Radcliffe ...................... 81/9.4 |
| 2,968,096 A | 1/1961 | Bonito et al. | |
| 2,997,787 A | * 8/1961 | Wheeler ...................... 30/91.2 |
| 3,130,616 A | * 4/1964 | Miller ........................ 30/91.2 |
| 3,172,133 A | * 3/1965 | Rizzo ......................... 30/90.4 |
| 3,283,404 A | * 11/1966 | Hickman .................... 30/91.2 |
| 3,733,627 A | 5/1973 | Epstein | |
| 3,854,202 A | 12/1974 | Cortese et al. | |
| 3,872,746 A | 3/1975 | Wittes et al. | |
| 3,890,858 A | 6/1975 | Lawson et al. | |
| 4,366,730 A | * 1/1983 | Casadio ...................... 81/9.43 |
| 4,381,661 A | * 5/1983 | Wiener et al. ............... 81/9.44 |
| 4,480,509 A | 11/1984 | Hydary | |

* cited by examiner

Primary Examiner—James G. Smith
Assistant Examiner—Hadi Shakeri
(74) Attorney, Agent, or Firm—Thomas L. Bohan; Patricia M. Mathers

(57) ABSTRACT

An adjustment mechanism for a wire stripper that sets the initial minimum opening between cutter jaws so that the jaws close snugly around a wire, and then adjusts the opening to provide a clearance distance so that the wire is not damaged when the jaws cut through the insulation.

16 Claims, 3 Drawing Sheets

WIRE STRIPPER

This application is a continuation-in-part of pending application Ser. No. 09/781,790, filed on Feb. 12, 2001.

BACKGROUND INFORMATION

1. Field of the Invention

The invention relates to V-notch wire strippers and particularly, to wire strippers with an adjustable stop mechanism for adjusting the wire stripper to a specific wire gauge.

2. Description of the Prior Art

Wire strippers have long been known and there are numerous variations on the basic device. The critical feature of the wire stripper is to provide the capability of adjusting a stop for the cutters so that, when the device is closed, the cutters cut through the insulation around the wire, but do not nick or damage the wire conductor. The conventional wire stripper today has two cutter bars that are movably attached to each other in an intermediate section of the bars such that when the handgrips at one end of the cutter bars are closed, the cutter jaws at the other end of the bars close around the wire to be stripped. Typically, each cutter jaw has a V-notch in the cutting area so that when the cutting jaws close toward each other, a cross-section that corresponds to the cross-section of the uninsulated wire conductor remains open and the cutting edges of the cutting jaws cut through only the insulation. The goal of all such strippers is to establish the minimum opening between the cutter jaws that will snugly embrace the stripped wire, i.e. the minimum opening that will cut through the insulation without damaging the wire itself, when the handgrips are squeezed together.

Since it is critical that the strippers don't close too closely around the wire, wire strippers typically have some type of adjusting mechanism or stop mechanism to set the minimum opening of the cutter jaws. The types of stop or adjusting mechanisms include cams, star-shaped wheels, and nut-and-screw slides in a groove. These mechanisms are mounted on a lower portion of one of the cutter bars and effectively stop the other cutter bar from closing too far. Many of these mechanisms require the use of a screwdriver or other tool to adjust the mechanism. This is a disadvantage, because it generally takes two hands to hold the wire stripper around a wire to adjust the stripper to the proper gauge. To have to use a screwdriver or other tool to loosen or tighten the adjusting mechanism is cumbersome and leads to inaccuracy. A shortcoming of the conventional adjusting or stop mechanisms, however, is that they do not provide for a safety clearance to ensure that the cutter jaws do not nick the conductor. Thus, determining the proper adjustment for the tool still requires guesswork on the part of the person using the tool and possibly several trials and corrections of the tool.

A further disadvantage of many of the conventional devices is that the adjusting mechanism "walks" when it is being set. For example, one can adjust the stripper to properly fit the wire gauge, only to have the mechanism move slightly during tightening, with the end result that the cutter jaws close too closely and then cut into the wire when the stripper grippers are squeezed closed, or are too far apart so that the jaws do not cut through the insulation properly, making it difficult to strip it from the conductor. In addition, most wire strippers have a spring mechanism that biases the cutters and grippers to an open position. The spring bias is generally desirable, because it ensures that the stripper will spring open when one's grip on the grippers is released. The disadvantage of this spring bias, however, is that it increases the difficulty of accurately adjusting the stripper, because the hand gripping the wire stripper has to counteract the biasing force of the spring during adjustment. Because of these disadvantages of conventional wire strippers, adjusting the wire stripper is typically a trial-and-error operation that requires very careful visual inspection and may require several trial cuts before the tool is properly adjusted.

What is needed, therefore, is a wire stripper with an adjustable stop mechanism that will allow the operator of the tool to quickly and easily change or adjust the setting of the stripper, with excellent accuracy and repeatability. What is further needed is such a device that will automatically provide clearance for the uninsulated conductor, without the need to use additional tools or to know the wire gauge. What is yet further needed is such a device that provides a means of controlling a biasing spring to achieve the desired bias function and to quickly and easily convert the bias function of the spring to a hold function that holds the current position of the stripper.

SUMMARY OF THE INVENTION

It is an object of the present invention to provide a V-notch wire stripper that has an accurate and easily adjustable stop mechanism for setting the minimum proximity of the cutter jaws. The term "minimum proximity" or also "minimum opening" refers to the size of the opening in the cutter jaws that fits snugly around the bare wire when the stripper is closed. It is a further object of the invention to provide such a wire stripper that does not require the use of an additional tool such as a screwdriver to adjust the minimum proximity of the cutter jaws. It is a yet further object to provide such a wire stripper that automatically provides a safety clearance for the uninsulated wire. It is a still yet further object to provide such a stripper that has a biasing spring that, in a first position, biases the cutter bars open, but can be easily placed into a second position that helps to hold the then current opening of the stripper.

The objects are achieved by providing a wire stripper that has an adjustable stop mechanism that includes a cam and a slider mounted in a groove on one of the cutter bars. The slider has a tab on its upper end and another tab on its lower end. These tabs fit within the groove and serve as guides, allowing the slider to move along a section of the cutter bar. A detent, in some embodiments a hemispherical protrusion, is provided on the upper face of the slider. The cam also has a lever along one side which can be used to move the cam into a HOLD position, a CUT position, or into a RELEASE position. When the cam lever is pushed to the RELEASE position, the slider can be moved along the groove; when pushed to the HOLD position, the detente applies sufficient force against the slider to hold the slider in position in the groove; and when pushed to the CUT position, the position of the cam is adapted such to force the cutter bars apart slightly, so that the cutter bars cut through the insulation on the wire, yet provide a security clearance between the cutter edges and the conductor.

To adjust the stripper for a particular wire gauge, the operator first checks that the cam is in the RELEASE position. The operator then places a piece of uninsulated wire into the V-notch area of the cutter jaws and brings the cutter jaws together around the wire, such that the jaws close snugly around the wire, but without cutting into it. If uninsulated wire is not available, the operator can, of course, place a piece of insulated wire in the stripper and gently squeeze the grippers until he or she senses that the cutter jaws have cut through the insulation and just touched the wire. Once the cutter jaws have been brought into light contact with bare wire, the operator then slides the slider in the groove with the other hand until the edge of the slider touches the edge of the other cutter bar. At this point, the operator pushes the cam lever all the way to an inner stop that forces the cutter bars to open slightly more, thereby automatically providing the correct clearance for allowing the cutters to cut through the insulation without marking or damaging the conductor.

DETAILED DESCRIPTION OF THE INVENTION

Figure 1:
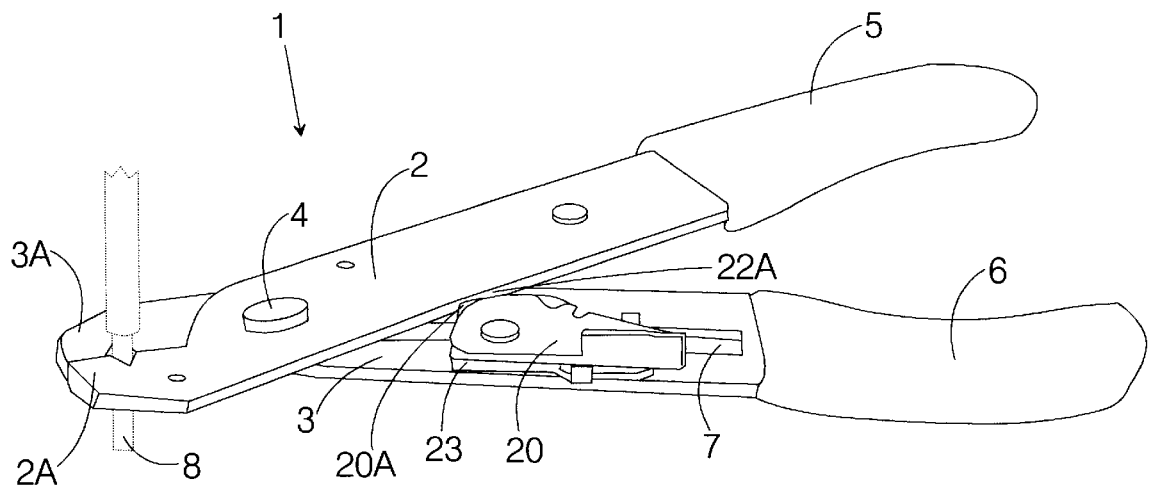
FIG. 1 is a perspective view of the front side of the V-notch wire stripper according to the Preferred Embodiment of the invention.

FIG. 1 shows the Preferred Embodiment of a V-notch wire stripper 1 according to the present invention. As can be seen, the wire stripper 1 comprises primarily a first cutter bar 2, a second cutter bar 3, and a stop mechanism 20. Each cutter bar 2, 3 has a cutter jaw at a respective upper portion of the bars 2, 3, designated respectively as 2A and 3A, and each jaw 2A, 3A is provided with a V-notch. The two cutter bars 2, 3 are pivotably attached to each other by means of a fastener 4. The lower portions of the two cutter bars 2, 3 extend into grippers, i.e., the first cutter bar 2 extends into a first gripper 5 and the second cutter bar 3 into a second gripper 6. A groove 7 is cut into the second cutter bar 3 and the stop mechanism 20 is seated in the groove 7. As shown in FIG. 1, the stop mechanism 20 has been slid in the groove 7 toward the jaw end of the cutter bar 3 until a limiting edge 20A contacts an edge of the first cutter bar 2 while the wire stripper 1 closes around the cross-section of an uninsulated section of wire 8, shown with dashed lines.

Figure 2:
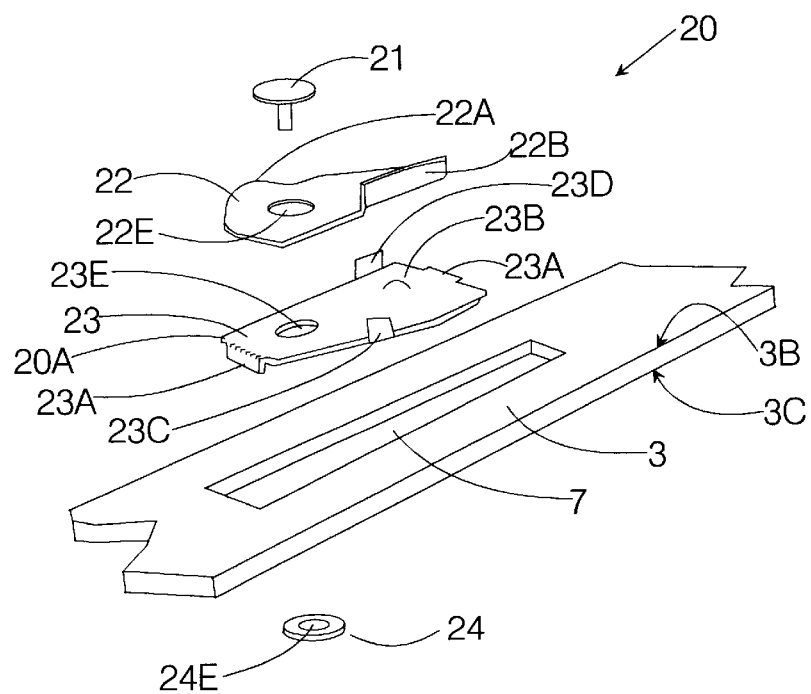
FIG. 2 is an exploded view of the individual components of the stop mechanism of the Preferred Embodiment of the invention, including the cam, the slider with the detent, the groove, and the fastener.

FIG. 2 is an exploded view of the individual components of the stop mechanism 20, which includes a cam plate 22 with a cam edge 22A and a slider 23. The slider 23 has a first end proximal to the jaw end of the wire stripper 1 and a second end proximal to the gripper end. A tab 23A is provided at each end of the slider 23. FIG. 2 shows only the tab 23A at the end proximal to the jaw end of the wire stripper 1. The slider 23 has an outer edge with an outer stop 23C and an inner edge with an inner stop 23D. The outer stop 23C and the inner stop 23D serve to limit the movement of the cam plate 22. A detent 23B, for example, a raised hemispherical protrusion, is provided on an upper face of the slider 23. A slider through-bore 23E and a cam through-bore 22E are provided respectively on the slider 23 and on the cam plate 22 such that the two through-bores are aligned one above the other. A lever 22B is provided along an outer edge of the cam plate 22 for the purpose of the adjusting the position of the cam plate 22.

To assemble the stop mechanism 20 in the wire stripper 1, the slider 23 and the cam plate 22 are arranged on an upper face 3B of the second cutter bar 3, over the groove 7, and aligned so that the respective slider and cam through-bores 23E and 22E are aligned with a concentric hole 24E in a fastener plate 24 that is positioned on the lower face of the cutter bar 3. A fastener 21 is inserted through the respective bores 22E, 23E, and 24E and fastened to the fastener plate 24, so as to hold the slider 23 and the cam plate 22 together in the groove 7. When the cam lever 22B is pushed against the outer stop 23C, the cam plate 22 and the slider 23 have a certain amount of play in the groove, allowing the stop mechanism 20 to slide in the groove 7. By sliding the cam plate 22 toward the inner stop 23D, the cam plate 22 slides across the detente 23B, thereby applying sufficient force to the cam plate 22 and the slider 23 to hold the stop mechanism 20 in a desired position with respect to the cutter jaws 2A, 3A.

Operation of the wire stripper 1 is as follows:

Hold the wire stripper 1 with one hand; and with the thumb of the same hand, push the cam lever 22B to the outer edge of the wire stripper 1. Slide the slider 23 in the groove 7 so that the wire stripper 1 can be opened sufficiently to receive a piece of wire to be stripped.

Insert a piece of uninsulated wire between the cutter jaws 2A, 2B and close the jaws around the wire. In the alternative, insert a piece of insulated wire, and squeeze the grippers gently until the cutter jaws just contact the bare wire.

Slide the slider 23 up toward the jaw end of the wire stripper 1 until the limiting edge 20A hits the opposite cutter bar 2.

Push the cam lever 22B toward the inner edge of the cutter bar 3. As the cam plate 22A slides across the detente 23B more force is required to move the cam lever 22B, as a result of the force applied by the detente 23B. Moving the cam plate 22 to the limit at the inner stop 23D rotates the cam edge 22A slightly, thereby forcing the cutter jaws 2A, 3A slightly farther apart. This provides the correct clearance in the V-notch wire stripper 1 that will allow the stripper 1 to cut through the insulation when the jaws 2A, 3A close over an insulated section of the wire, yet not mark or damage the wire conductor.

Figure 3:
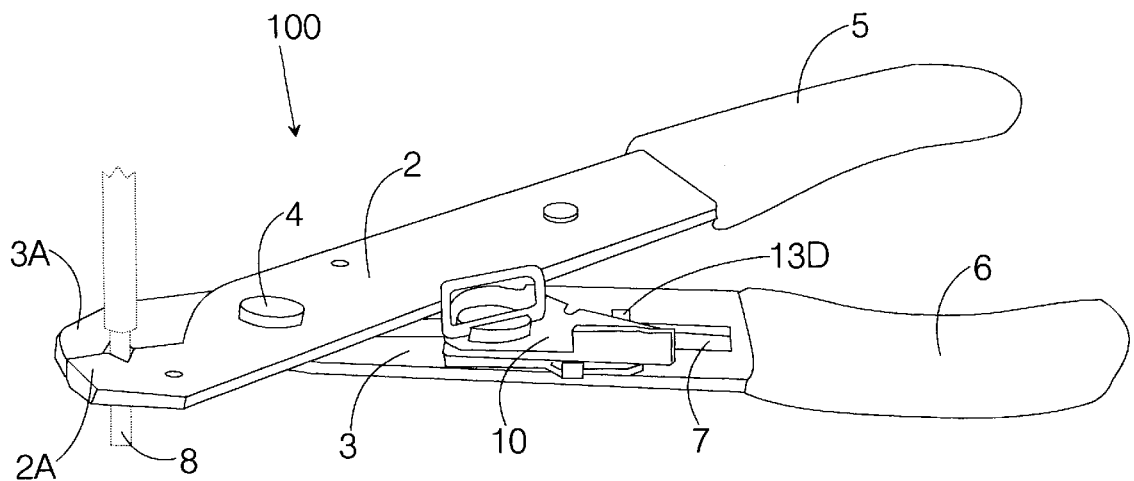
FIG. 3 is a perspective view of the front side of the V-notch wire stripper according to the alternative embodiment of the invention.
Figure 4:
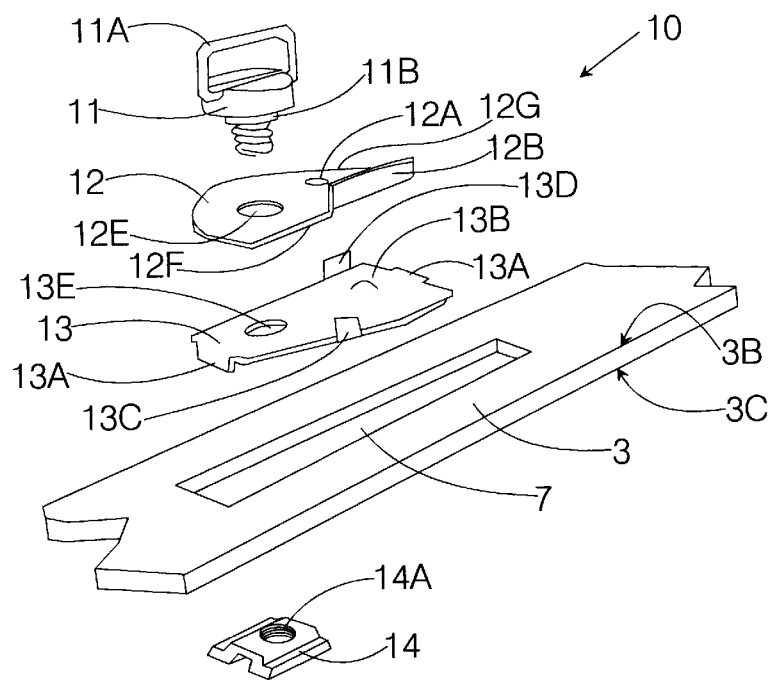
FIG. 4 is an exploded view of the individual components of the stop mechanism of the Preferred Embodiment of the invention, including the cam, the slider with the detent, the groove, and the fastener.

FIGS. 3 and 4 illustrate a wire stripper 100 that is an alternative embodiment of the wire stripper 1. Elements of this wire stripper 100 that are identical to elements of the wire stripper 1 are designated with the same reference numerals. As shown in FIGS. 3 and 4, the stop mechanism 10 of the alternative embodiment comprises a thumb screw 11 with a folding wire tab 11A, a cam plate 12, a slider 13, and a T-nut 14. The T-nut 14 has a threaded bore 14A and an upper contour that fits against the groove 7 on the lower face 3C of the second cutter bar 3. A cam plate through-bore 12E and a slider through-bore 13E are provided respectively on the cam plate 12 and the slider 13 such that they are axially aligned with each other. A detente 13B is provided on the slider 13 and a corresponding detente-seat 12A is provided on the cam plate 12. In this alternative embodiment, the detente seat 12A is a throughbore sized to receive the detente, although it is also possible to provide an indentation rather than a bore to seat the detente. The detent seat 12A is constructed to slide over and snap into position over the detent 13B. A lever 12B is provided along an outer edge of the cam plate 12.

The manner of using this wire stripper 100 is similar to that of the wire stripper 1, the difference being in the means of securing the cam plate 12. To adjust the opening of the cutter bars 2A, 3A, the steps are as follows:

Hold the wire stripper 100 with one hand and with the other hand fold up the wire tab 11A of the thumb screw 11, turn the tab 11A with fingers to loosen the thumb screw 11 (just enough to allow the stop mechanism 10 to slide in the groove 7), and move the cam lever 12B to the left until the cam 12 hits an outer stop 13C on the slider 13.

Place a section of uninsulated wire into the V-notch area of the cutter bars 2A, 3A and close the grippers 5, 6 until light contact is made between the wire and the two V-notches in the jaws 2A, 3A.

Slide the stop mechanism 10 on the second cutter bar 3 forward until it firmly contacts the edge of the first cutter bar 2.

Tighten the thumb screw 11 by turning the wire tab 11A and then fold the tab 11A down, so that it does not interfere with operation of the stripper 100.

Move the cam lever 12B to the right until the cam 12 stops against the inner stop 13D and the detente seat 12A snaps into place over the detent 13B. The cam 12 is constructed so that, in this position, it will slightly increase the minimum opening between the respective V-notch areas on the jaws 2A, 3A of the cutter bars 2, 3 when the stripper 100 is closed. This automatically provides the correct clearance in the V-notch wire stripper 100 that will allow the stripper 100 to cut through the insulation when the jaws 2A, 3A close over an insulated section of the wire, yet not mark or damage the wire conductor.

Figure 5:
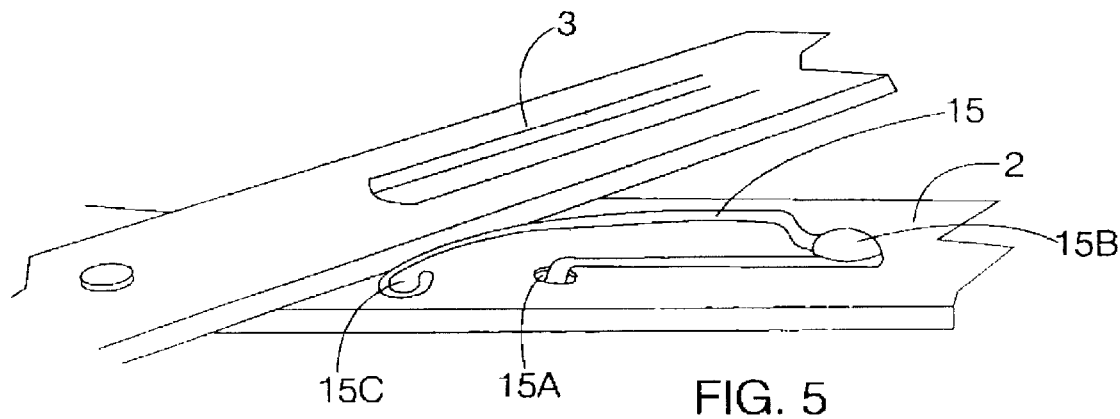
FIG. 5 is a perspective view of the rear side of the V-notch wire stripper according to the invention, with the biasing spring in the BIAS position.
Figure 6:
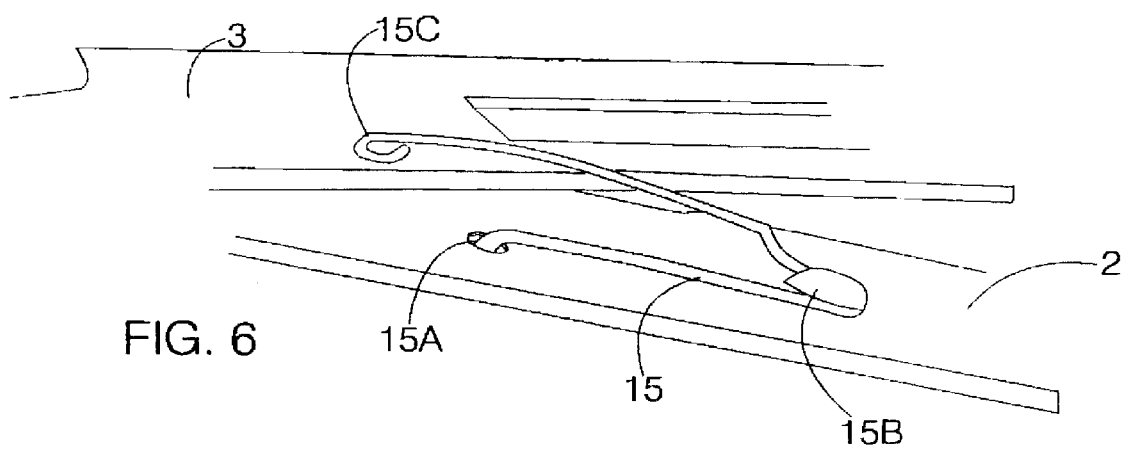
FIG. 6 is a perspective view of the rear side of the V-notch wire stripper according to the invention, with the biasing spring in the HOLD position.
Figure 7A:
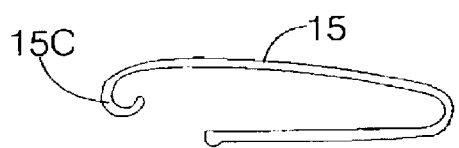
FIG. 7A shows a top view of the biasing spring according to the invention.
Figure 7B:
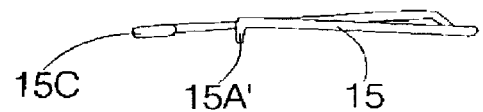
FIG. 7B shows a side view of the biasing spring according to the invention.

FIGS. 5 and 6 illustrate a BIAS and a HOLD feature, respectively, provided by a biasing spring 15 that is adaptable to both the Preferred Embodiment and the alternative embodiment of the wire strippers 1, 100. For simplicity's sake, reference is made hereinafter to the Preferred Embodiment of the wire stripper 1 in the description of the biasing spring 15, though it is to be understood that use of the biasing spring 15 is just as applicable to the alternative embodiment of the wire stripper 100. FIGS. 7A and 7B show a top view and a side view, respectively, of the spring 15.

As shown in FIGS. 5 and 6, the wire-type spring 15 is mounted on the first cutter bar 2 by means of a rivet 15B that holds the spring 15 in place on the cutter bar 2 and a retaining hole 15A into which a fixed end 15A' is inserted and held. When the biasing spring 15 is in the BIAS position shown in FIG. 5, it exerts a force against the side edge of the cutter bar 3. This force will automatically force the stripper 1 to open when the operator loosens his or her grip on the tool. By flipping an operating end 15C of the spring 15 up over the upper surface of the second cutter bar 3, the spring 15 no longer forces the stripper 1 open when one or the other gripper 5, 6 is released, but holds the then current position of the stripper 1. This HOLD function is desirable when setting the stop mechanism 20 and is achieved by the force of friction between the two cutter bars 2, 3 that results from the force the operating end of the spring 15 exerts on the two cutting bars 2, 3. By simply opening the grippers 5, 6 wide, the operative end 15C of the spring 15 automatically drops down into its BIAS position on cutter bar 2, shown in FIG. 5, where it now exerts a force on the cutter bar 3 to bias the stripper 1 to an open position.

The embodiments mentioned herein are merely illustrative of the present invention. It should be understood that variations in construction of the present invention may be contemplated in view of the following claims without straying from the intended scope and field of the invention herein disclosed.

What is claimed is:

1. An improvement to a wire stripper comprising a primary cutter bar and a secondary cutter bar, the primary cutter bar having a primary first end with a primary cutter jaw, a primary second end having a gripper handle, and a primary intermediate section, and the secondary cutter bar having a secondary first end with a secondary cutter jaw, a secondary second end having a gripper handle, and a secondary intermediate section, wherein the primary cutter bar and the secondary cutter bar are pivotably attached to each other at their respective intermediate sections, and the primary cutter jaw and the secondary cutter jaw each have a V-notch that together define a minimum opening for receiving a wire when the stripper is closed, said improvement comprising:

a first adjustment mechanism for setting said minimum opening for receiving said wire, said minimum opening being sized so as to snugly fit around a stripped wire when said stripper is closed, wherein said first adjustment mechanism is mounted in said secondary intermediate section; and a second adjustment mechanism for adjusting said minimum opening to a clearance opening, said clearance opening being slightly larger than said minimum opening and providing a slight clearance around said stripped wire, said second adjustment mechanism having a first position and a second position, wherein said second adjustment mechanism is included on said first adjustment mechanism.

2. The improvement of claim 1, wherein a groove is provided in said secondary intermediate section and said first adjustment mechanism includes a slider that is slidably disposed in said groove, a cam plate mounted on said slider, and a locking mechanism;

wherein said slider is releasably fixable in a certain position by means of said locking mechanism.

3. The improvement of claim 2, wherein said cam plate has a first through-bore, said slider has a second through-bore, and said groove has an upper face and a lower face; and wherein said locking mechanism includes a T-nut that fits into said lower side of said groove and a thumb screw that extends through said first through-bore of said cam plate and said second through-bore of said slider into a threaded section of said T-nut so as to releasably fix said cam plate in said certain position.

4. The improvement of claim 3, wherein said slider has an outer stop flange and an inner stop flange and said cam plate has an outer stop surface and an inner stop surface, wherein, when said outer stop surface of said cam plate is placed against said outer stop flange, said first adjustment mechanism is adjustable for setting said minimum opening for receiving said wire, and, when said inner stop surface of said cam plate is placed against said inner stop flange, said second adjustment mechanism adjusts said minimum opening to said clearance opening by slightly increasing said minimum opening.

5. The improvement of claim 3, wherein said slider has an outer stop flange and a protrusion that serves as a detente and said cam plate has an outer stop surface and a detente recess for receiving said protrusion, wherein, when said outer stop surface of said cam plate is placed against said outer stop flange, said first adjustment mechanism is adjustable for setting said minimum opening and, when said outer stop surface of said cam plate is slidably moved away from said outer stop flange until said detente recess snaps over said protrusion, said second adjustment mechanism adjusts said minimum opening to said clearance opening by slightly increasing said minimum opening.

6. The improvement of claim 3, wherein said slider has an outer stop flange, an inner stop flange and a protrusion that serves as a detente and said cam plate has an outer stop surface, an inner stop surface, and a detente recess for receiving said protrusion, wherein, when said outer stop surface of said cam plate is placed against said outer stop flange, said first adjustment mechanism is adjustable for setting said minimum opening and, when said outer stop surface of said cam plate is slidably moved away from said outer stop flange until said detente recess snaps over said protrusion and said inner stop surface is placed against said inner stop, said second adjustment mechanism adjusts said minimum opening to said clearance opening by slightly increasing said minimum opening.

7. The improvement of claim 1, further comprising a releasable biasing spring mounted on said secondary cutter bar.

8. The improvement of claim 7, wherein said secondary cutter bar has a secondary a lower surface and a secondary inner side face and said primary cutter bar has a primary lower surface, and said releasable biasing spring is mounted on said primary lower surface;

wherein said spring has an operating end that can be alternatively placed in a biasing position and in a holding position;

wherein, in said biasing position, said operating end of said spring lies on said primary lower surface and presses against said secondary inner side face so as to bias said stripper to an open position; and wherein, in said holding position, said operating end of said spring lies against said secondary lower surface and maintains a current position of said stripper.

9. An improvement to a wire stripper comprising a primary cutter bar and a secondary cutter bar, the primary cutter bar having a primary first end with a primary cutter jaw, a primary second end having a gripper handle, and a primary intermediate section, and the secondary cutter bar having a secondary first end with a secondary cutter jaw, a secondary second end having a gripper handle, and a secondary intermediate section, wherein the primary cutter bar and the secondary cutter bar are pivotably attached to each other at their respective intermediate sections, and the primary cutter jaw and the secondary cutter jaw each have a V-notch that together define a minimum opening for receiving a wire when the stripper is closed, said improvement comprising:

a wire stripper adjustment means having a release position, a minimum-opening position, and a wire-clearance position, and a locking means that releases said wire stripper adjustment means in said releasable position, and locks said wire stripper adjustment means respectively in said minimum-opening position and in said clearance position;

wherein, when in said release position, said wire-stripper adjustment means is movable so as to adjust said minimum opening of said primary cutter jaw and said secondary cutter jaw to receive a wire, wherein, when in said minimum-opening position, a minimum opening between said primary and secondary cutter jaws is sized so that the cutter jaws snugly fit around a stripped wire when said stripper is closed, and, wherein when in said clearance position, said primary and secondary cutter jaws are moved a slight distance farther apart than when set in said minimum-opening position.

10. The improvement of claim 9, said wire-stripper adjustment means including:

a first adjustment means for setting said minimum opening for receiving said wire, said first adjustment means being slidably mounted in said secondary intermediate section so as to set said minimum-opening position; and a second adjustment means mounted on said first adjustment means and adaptable to set said clearance position for adjusting said minimum opening to a clearance opening.

11. The improvement of claim 10, wherein a groove is provided in said secondary intermediate section and said first adjustment means includes a slider that is slidably disposed in said groove and is releasably fixable in a certain position in said groove by means of said locking means.

12. The improvement of claim 11, wherein said second adjustment means includes a cam plate with a cam through-bore, said slider has a slider through-bore, and said groove has an upper face and a lower face; and wherein said locking means includes a fastener plate having a center-bore, said fastener plate being seatable against said lower face of said groove, and a fastener that extends through said cam through-bore and said slider through-bore into said fastener plate so as to slidably hold said first adjustment means in said groove and said second adjustment means vertically aligned with said first adjustment means.

13. The improvement of claim 12, wherein said slider has an outer stop flange and an inner stop flange and said cam plate has an outer stop surface and an inner stop surface, wherein, when said outer stop surface of said cam plate is placed against said outer stop flange, said first adjustment means is slidably adjustable in said groove for setting said minimum opening of said cutter jaws for receiving said wire, and, when said inner stop surface of said cam plate is placed against said inner stop flange, said second adjustment means adjusts said minimum opening to said clearance opening by slightly increasing said minimum opening.

14. The improvement of claim 13, wherein when said second adjustment means is moved toward a minimum-opening position, said cam plate slides across said detente and said detente applies a force to said locking means that is sufficient to hold said cutter jaws in a certain position.

15. The improvement of claim 9, further comprising a releasable biasing spring.

16. The improvement of claim 15, wherein said secondary cutter bar has a secondary lower surface and a secondary inner side face and said primary cutter bar has a primary lower surface, and said releasable biasing spring is mounted on said primary lower surface;

wherein said spring has an operating end that can be alternatively placed in a biasing position and in a holding position;

wherein, in said biasing position, said operating end of said spring lies on said primary lower surface and presses against said secondary inner side face so as to bias said stripper to an open position; and wherein, in said holding position, said operating end of said spring lies against said secondary lower surface and maintains a current position of said stripper.

* * * * *